Figure 1:
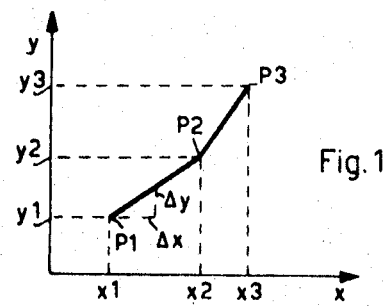

United States Patent [19]
Pomella et al.

[11] 3,749,996

[45] July 31, 1973

[54] NUMERICAL CONTROL DEVICE FOR MACHINE TOOLS WITH PROVISION FOR SPEED ADJUSTMENT DURING MOTION

[75] Inventors: Piero Pomella, Luciano Lauro, both of 10015 Ivrea, Italy

[73] Assignee: Ing. C. Olivett & C., S.P.A., Turin, Italy

[22] Filed: Jan. 28, 1971

[21] Appl. No.: 110,651

Related U.S. Application Data

[63] Continuation of Ser. No. 759,912, Sept. 16, 1968, abandoned.

[30] Foreign Application Priority Data

Sept. 16, 1967 Italy...........................53043A/67

[52] U.S. Cl. ............................................... 318/571
[51] Int. Cl. ........................................... G05b 19/24
[58] Field of Search .................................... 318/571

[56] References Cited
UNITED STATES PATENTS
3,325,633  6/1967  Lukens ........................... 318/571 X

*Primary Examiner*—T. E. Lynch
*Attorney*—Birch, Swindler McKie & Beckett

[57] ABSTRACT

A numerical control device for such as machine tool operation in which position and speed of movement of the tool or the workpiece is automatically effected in accordance with a preset program and certain recorded pre-selected information. The control provides for movement generally in three phases: (1) acceleration to a predetermined maximum speed; (2) constant speed; and, (3) deceleration to zero speed. Also, adjustability of the maximum speed during movement is provided for.

4 Claims, 13 Drawing Figures

INVENTORS
PIERO POMELLA
LUCIANO LAURO

HIGH VOLTAGE HOLD DOWN CIRCUIT FOR HORIZONTAL DEFLECTION CIRCUIT

This invention relates to electrical circuits and more particularly to deflection circuits of the type used to develop a high voltage.

In many horizontal deflection circuits, a damper diode is coupled across the horizontal output transformer primary winding to damp out oscillations which would occur due to the ringing caused by the flyback pulse during the retrace portion of each deflection cycle. The damper diode is poled to conduct when the flyback voltage swings across the zero voltage level. In addition to providing a damping function, during a first part of trace this diode conducts to provide a current path for yoke current which is in a direction to place a charge on an S-shaping capacitor serially coupled to the yoke.

In some horizontal deflection output circuits, a high voltage multiplier is employed to develop the ultor voltage. Such a multiplier is described in detail in a copending application Ser. No. 830,026, entitled "ULTOR VOLTAGE SUPPLY," filed on June 3, 1969 and assigned to the present assignee, now abandoned. When a multiplier circuit of this type is utilized in conjunction with any horizontal output deflection stage, it rectifies the peak-to-peak voltage present at its input. If the damper diode is open circuited, and therefore allows the flyback voltage to swing negative as well as positive, the peak-to-peak voltage appearing at the input to the voltage multiplier may rise causing the output voltage to rise to an excessively high value (for example, 40,000 volts as compared to the normal 26,500 volts). If the ultor voltage reaches this level, the phosphor on the face of the kinescope will be destroyed due to the impacting high energy electrons. Also, an X-radiation hazard may exist. Thus, it is important to hold the high voltage to a safe level if the damper diode fails.

The damper diode may become open circuited due to an electrical failure within the device. More commonly, however, when diodes are utilized which are mechanically clipped into the horizontal output stage, it is possible during servicing that the diode is either not replaced, or a faulty electrical connection is made at the mechanical terminals.

It is therefore an object of the present invention to prevent the ultor voltage from reaching an excessive level in a deflection output stage utilizing a high voltage multiplier when the damper diode current path is removed.

One proposed solution to this problem is described in a copending application entitled "HIGH VOLTAGE HOLD DOWN CIRCUIT" by J. J. McArdle and R. L. Rauck, Ser. No. 36,046 filed on May 11, 1970, now U.S. Pat. No. 3,697,800 and assigned to the present assignee. In the circuitry of that application, a hold down voltage was applied directly to a control electrode of an output device in the horizontal output stage. In certain circuits, such as the two silicon controlled rectifier type shown in that application; although the protection circuit operates to prevent damage to the color kinescope, in some instances the silicon controlled rectifier was destroyed due to excessive gate current drawn by the protection diode during the failure mode of operation, during kinescope arcing or during the initial application of operating power to the receiver. The circuit of the present invention, however, will maintain the high voltage supply at a safe level in the event of the loss of conduction of the damper diode without damaging the horizontal output active device.

Deflection circuits embodying the present invention are of the type employing a deflection signal generator, which may include suitable automatic phase and frequency control apparatus, driving a power output stage which includes means for developing a high voltage from the flyback pulse developed in the circuit. The power output stage includes a diode to provide a conduction path for deflection current during a portion of each deflection cycle. In the event the diode opens, the direct voltage level at a point in the power output stage changes and is used to alter the frequency of operation of the deflection signal generator to prevent the generation of an excessive high voltage. It is contemplated that the frequency of the deflection signal generator can be altered to zero frequency.

The operation of the present invention can be best understood by referring to the sole FIGURE and description thereof in which:

FIG. 1 is a circuit diagram partly in schematic and block form of a television receiver embodying the present invention.

In FIG. 1, the television receiver includes an antenna 10 which receives composite television signals and couples them to a tuner second detector stage 11. This stage normally includes a radio frequency amplifier for amplifying the received signals, a mixer-oscillator for converting the amplified radio frequency signals to intermediate frequency signals, an intermediate frequency amplifier; and a detector for deriving composite television signals from the intermediate frequency signals. The output of stage 11 is coupled to a video amplifier 12 which amplifies the synchronization, and brightness representative portion of the composite television signals and applies these signals to a control electrode (e.g., the cathode) of a television kinescope 13. The composite television signal from video amplifier 12 is also applied to a synchronizing signal separator circuit 14 which separates the synchronization signals from the video signals, and also separates the vertical and the horizontal synchronizing signals. The separated vertical synchronizing signals are coupled from sync separator stage 14 to a vertical deflection generator 15 which develops vertical frequency signals. The output of vertical deflection generator 15 is coupled to the vertical output circuit 16 which provides the required vertical deflection current to a vertical deflection winding 17 associated with a kinescope 13 by means of terminals Y—Y.

Horizontal synchronizing pulses derived from sync separator 14 are applied to a phase comparator 18, which is also supplied with a second signal related in time occurrence to the operation of a horizontal oscillator 19 by means of a secondary winding 50s on a horizontal output transformer 50. An error voltage is developed in the phase comparator 18 and is applied to a horizontal oscillator stage 100 to synchronize the horizontal oscillator frequency to that of the horizontal synchronizing pulses.

Horizontal oscillator stage 100 includes a transistor 150 having a base terminal 150b, a collector terminal 150c and an emitter terminal 150e. The emitter terminal 150e is coupled directly to ground. Oscillator 100 is of the blocking oscillator type employing a transformer 120 having a first winding 122 with a first terminal coupled to the base terminal 150b of transistor 150 and a second terminal remote from the base terminal connection coupled to the phase comparator 18 by means of a series combination of a coupling capacitor 115 and a waveshaping network 110. The junction of capacitor 115 and transformer 122 is also coupled to the junction of an adjustable resistor 144 and a resistor 146 by means of a resistor 112. A secondary winding 124 on transformer 120 has a first terminal coupled to the collector terminal 150c of transistor 150 and a second terminal coupled to a circuit terminal A. A third winding 126 on transformer 120 has a first terminal coupled directly to ground and a second terminal coupled to the horizontal output stage 25 by means of a coupling capacitor 152.

A regulated voltage supply employed to provide operating power for the oscillator comprises a voltage dropping resistor 130 coupled from a voltage source (B+) to a voltage regulating device such as a Zener diode 132. The Zener diode 132 is bypassed by a filter capacitor 134. Terminal point A which is coupled to the junction of the voltage dropping resistor 130 and the Zener diode 132 is thereby maintained at a relatively constant voltage indicated as +V in the FIGURE during normal operation.

As well as supplying the operating voltage for the transistor 150, this regulated voltage supply (+V) supplies the charging current which flows through the series combination of resistors 140, 142, 144, 146 and 148 to charge capacitor 149 in the polarity shown in the diagram to develop the turn on voltage for transistor 150. Adjustable resistor 144 is the frequency limiting resistor, whereas adjustable resistor 142 is the horizontal hold control for finely adjusting the exact frequency of the horizontal oscillator 100. Thermistor 141 is coupled from the junction of resistors 140 and 142 to ground, and a capacitor 143 is coupled from the junction of resistors 142 and 144 to ground. The junction of resistor 140 to resistor 142 is coupled to a capacitor 56 in series with a primary winding 50p of a flyback transformer 50 by means of the series combination of a diode 158 and a resistor 156.

The operation of the blocking oscillator type horizontal oscillator stage 100 is described in detail in the publication "Solid State Color Television" published by RCA Sales Corporation, 600 N. Sherman Drive, Indianapolis, Ind., and will not be described here. Oscillator 100 provides horizontal deflection output signals across winding 126 of transformer 120. These drive signals are applied to a horizontal output stage 25 by means of the coupling capacitor 152.

The operation of the deflection circuit 25 is described in detail in U.S. Pat. No. 3,452,244 assigned to the present assignee. The deflection circuit comprises a bi-directionally conductive trace switching means including a silicon controlled rectifier (SCR) 29 and a parallel coupled diode 30. The trace switching means couples a relatively large S-shaping capacitor 37 across deflection winding 31 during the trace portion of each deflection cycle. A first capacitor 28 and a commutating inductor 26 are coupled between the trace switching means and a bi-directionally conductive retrace switch which includes a semiconductor device (SCR) 21 and a parallel coupled diode 22. A second capacitor 27 is coupled from the junction of capacitor 28 and inductor 26 to ground. A B+ voltage supply is coupled to a relatively large supply inductor 23 which is further coupled to the junction of commutating inductor 26 and the commutating switching means 21, 22.

An output transformer 50 having a primary winding 50p is coupled across the combination of deflection winding 31 and capacitor 37 by a capacitor 56 coupled between the low voltage terminal on the primary winding to ground. A high voltage winding 50h provides voltage pulses to a high voltage multiplier 52. Multiplier 52 multiples the applied voltage to supply at its output, the ultor voltage which is coupled to a terminal 53 on kinescope 13. Having described the circuit, the operation of the invention included therein follows.

As the trace interval of each deflection cycle is initiated, current flowing in yoke 31 is at a maximum value due to prior circuit action involving resonant energy exchanges between inductors 23 and 26, capacitors 27 and 28, the high voltage circuit and deflection winding 31. Yoke current at this time is in a direction illustrated by the arrow accompanying the symbol $I_1$ in FIG. 1. At this time (the beginning of trace), damper diode 30 conducts to complete the yoke current path and current $I_1$ flows in a direction to impress a voltage of a polarity shown in the diagram on capacitor 37.

At the mid-point of trace, which corresponds to the center of the scanned raster, the magnitude of current $I_1$ has decreased to zero and SCR 29 is triggered into conduction by means of a trigger circuit 24 which is supplied by a signal from a winding 23s on an input reactor 23. As the second portion of the trace interval begins, capacitor 37 supplies energy to the yoke and the current is in a direction illustrated by the arrow accompanying the symbol $I_2$ (i.e., opposite to the direction of $I_1$). SCR 29 completes the yoke current conduction path. During the latter portion of the trace interval and prior to retrace, a signal from the horizontal oscillator 19 serves to trigger SCR 21 into conduction. This begins a complex series of energy exchanges between the reactive components as explained in detail in U.S. Pat. No. 3,452,244 cited above which serves to interrupt the yoke current path at the end of the trace portion of the deflection cycle by turning off SCR 29. As the yoke current, which is at a maximum value, is interrupted, the magnetic field associated with the yoke current begins to collapse producing a voltage pulse on a conductor 40 which is commonly referred to as the flyback pulse.

This pulse which appears on conductor 40 is positive in the present circuit and occurs during the retrace interval. At the end of retrace, the flyback voltage will start to swing negative. When diode 30 is operative, however, the voltage at conductor 40 is prevented from going negative, since diode 30 conducts to clamp the voltage at approximately −0.7 volts. If for any reason diode 30 is not conductive, the flyback pulse will be allowed to swing negative, and the peak-to-peak input voltage to the high voltage multiplier 52 will be nearly doubled, thereby producing an ultor voltage of an undesirably high level. By adding a diode 158 and a resistor 156 between the horizontal oscillator and capacitor 56, however, the high voltage will be prevented from rising to an excessive level.

During normal circuit operation, the voltage across capacitor 56 varies as illustrated by the voltage waveform $V_{56}$ shown by the waveform diagram adjacent capacitor 56. During the first portion of each horizontal trace interval (the period shown as $T_1$ in the waveform diagram), a current $I_1'$ flows in the direction shown by $$Dx(n + 1) = Dxn + hx \quad (2)$$

$$x(n + 1) = xn + Dx(n + 1) \quad (3)$$

Formula (3) establishes what must be the position $x(n + 1)$ of the movable part at the end of the $n$th interpolation cycle on the basis of the position $xn$ at the beginning of this cycle.

Formula (2) establishes, on the basis of the position increment $Dxn$ used in the preceding interpolation cycle, what must be the position increment (speed) $Dx(n + 1)$ to be used in the present $n$th interpolation cycle.

As $hx$ is constant, it is clear that formula (2) ensures that the section or segment $x1 - x2$ of the path is covered at a constant acceleration proportional to $hx$.

Figure 2:
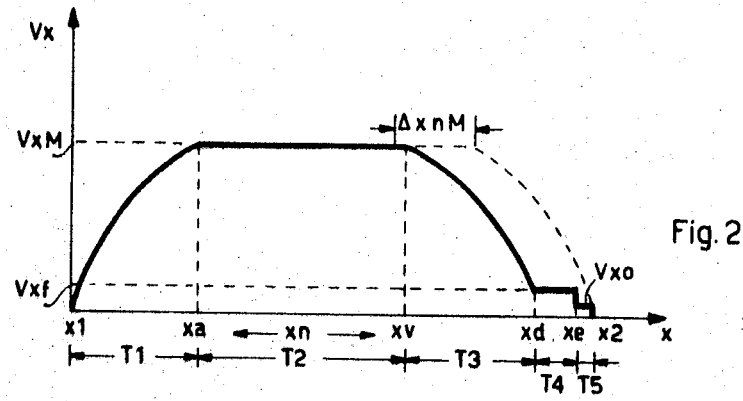

In this initial phase T1, apart from (1), (2) and (3), which are interpolation operations proper, the following additional operations are carried out for the purpose of calculating data necessary for determining the instants when the changes of acceleration take place in the diagram of FIG. 2;

$$\sum_{1}^{n} Dxn = \sum_{1}^{n-1} Dxn + Dxn \quad (4)$$

$$\sum_{1}^{n} Dxn + Dxn = Pxn \quad (5)$$

$$x2 - xn = Rxn \quad (6)$$

$$Dxn > DxM \quad (7)$$

Operation (4) defines the value of the progressive distance $$xn - x1 = \sum_{1}^{n} Dxn$$

travelled by the movable part from the beginning $x1$ of the present recilinear path segment to the end of the $(n - 1)$th interpolation cycle, this progressive distance being derived from the progressive distance $$\sum_{1}^{n-1} Dxn$$

travelled at the end of the $(n - 2)$th interpolation cycle and from the position increment $Dxn$ which has occurred in the $(n - 1)$th interpolation cycle.

Operation (5) defines the value of a fictitious distance $Pn$ equal to the aforesaid progressive distance $$\sum_{1}^{n} Dxn = xn - x1$$

increased by the last increment $Dxn$.

Operation (6) defines the value $Rxn$ of the remaining distance which the movable part must still travel at the end of the $(n - 1)$th interpolation cycle to reach the final point $x2$.

Moreover, during the entire phase T1 of constant acceleration, the comparison operation (7) is carried out at each interpolation cycle, that is a check is made to see whether the instantaneous speed (position increment) $Dxn$ has or has not exceeded the maximum permissible speed $DxM$.

Simultaneously, during this phase T1, operations similar to (4), (5), (6) and (7) are carried out for the Y axis in the interpolating unit, these operations being obtainable from the operations (4), (5), (6) and (7) by simply substituting the letter $y$ for the letter $x$.

The initial phase T1 of constant acceleration terminates at the end of that interpolation cycle in which the inequality (7) has occurred for the axis X or for the axis Y. More precisely, the the phase T1 terminates at the end of that interpolation cycle in which, on the basis of formula (2), there has been calculated for the axis X or for the axis Y an increment $Dxn$ or $Dyn$ greater than the maximum permissible increment $DxM$ or $DyM$. The last increments calculated (that is, the speeds reached) at the end of the phase T1 will hereinafter be referred to as $DxnM$ and $DynM$ respectively. It is to be noted that the final increments $DxnM$ and $DynM$ may exceed the maximum increments $DxM$ and $DyM$ by an amount not greater than the minimum increment $hx$ and $hy$, respectively. That is, the phase T1 terminates when there has been reached either along the X axis or along the Y axis the maximum speed permissible for that axis. It sbould be noted that, depending on the inclination of the path with respect to the axes and on the possible diversity of the maximum speeds permitted for the two axes, it may happen that the inequality (7) occurs first for the X axis or for the Y axis.

At the end of the phase T1, the summation $$\sum_{1}^{n} Dxn$$

obtained on the basis of formula (4) represents the total distance $xa - x1$ which has been travelled along the axis X at the end of the interpolation cycle in which the maximum permitted speed has been reached or exceeded either along the X axis or along the Y axis. The distance $xa - y1$ therefore represents the distance which it has been necessary to travel in order to reach the maximum speed at constant acceleration.

The value $PxnM$ of the fictitious distance $Pnx$, which corresponds to the distance $xa - x1$ increased in accordance with formula (5), is stored in a suitable register at the end of the phase T1 and is preserved therein.

The initial phase T1 of constant acceleration is followed (FIG. 2) by the phase T2 of constant speed, during which the movable part continues its movement at a speed equal to $DxnM$ for the X axis and to $DynM$ for the Y axis, which is reached at the end of the phase T1.

During this phase T2, the interpolating unit carries out the following operations:

$$x(n + 1) = xn + DxnM \qquad 3'$$

$$x2 - xn = Rxn \qquad 6$$

$$Rxn < PxnM \qquad 8$$

Formula (3') is similar to formula (3), with the difference that the position increment in the successive interpolation cycles is now constant and equal to D$xn$M, whereby the speed becomes precisely constant.

Formula (6) has already been explained.

Inequality (8) is verified by comparing at each interpolation cycle the remaining distance R$xn$ which is still to be covered to reach the final point $x2$ with the fictitious distance P$xn$M stored in the register. The phase T2 of constant speed terminates at the end of the interpolation cycle in which the inequality (8) has occurred for the first time.

The phase T2 of constant speed is followed (FIG. 2) by the phase T3 of constant deceleration, during which the movable part decelerates with the same absolute acceleration values (proportional to $hx$ and $hy$, respectively, for the two axes) already used in the acceleration phase T1.

During the phase T3, the interpolating unit carries out the following operations:

$$Dx(n + 1) = Dxn - hy \qquad (2')$$

$$x(n + 1) = xn + Dx(n + 1) \qquad (3)$$

$$Dxn < 1 \ \mu m \qquad (9)$$

Operation (2') is similar to operation (2), apart from the sign of the speed increment $hx$.

The comparison operation (9) is used to establish, in the manner hereinafter explained, the end of the constant deceleration phase.

Comparison (8) for establishing the start of the deceleration is made by considering the fictitious distance P$xn$M, suitably increased in the manner which has already been stated with respect to the distance travelled during acceleration, instead of considering exactly this last-mentioned distance, because it is desired to guard against the possibility of the movable part arriving during deceleration at the final position $x2, y2$ with a speed different from zero and therefore continuing unduly beyond the arrival point P2. This contingency, which would be of no consequence in positioning arrangement of the point-to-point type, must be avoided here, since the entire path must be controlled, for example because it is traversed for the purpose of cutting a profile. It should be noted that, in order to avoid this contingency, it would not be sufficient to interrupt the interpolation and give a stop order to the movable part as soon as the distance $x2 - xn$ becomes less than the desired approximation, because it could happen that the speed reached during deceleration at that instant is still too high for the remaining space to be sufficient for stopping. On the other hand, in order to avoid this contingency, it is necessary, as has been done, to provide for the deceleration a distance equal to that travelled during acceleration plus an additional safety space sufficient for stopping, and since, during the phase T2 of constant speed, the coordinate $xn$ increases by increments D$xn$M, this additionl space cannot be less than D$xn$M.

Therefore, as the beginning of the phase T3 is determined by applying the comparison indicated by (8), that is as the deceleration begins as soon as the distance from the arrival point P2 is less than the distance travelled during acceleration plus D$xn$M, the movable part of the machine will have time to complete the deceleration before passing the final point P2. More particularly, it would not reach the arrival point P2, being left with a position error which is at the most $-DxnM$, or $-DynM$, respectively, for the X and Y coordinates.

It is therefore necessary that the constant deceleration phase is not protracted until stopping occurs, but is interrupted before stopping occurs and replaced by a movement of approach to the final point P2 which is carried out at low speed. It would be possible to effect this movement of approach at constant speed until the remaining distance $x2 - xn$ (or $y2 - yn$) reaches a limit value sufficiently low to guarantee the required accuracy of positioning and interrupt the interpolation at that point.

If, however, the speed of the movement of approach is chosen too low, too much time is lost. If, on the contrary, the speed is chosen too high, it may happen that the final point will be passed during the movement of approach. This last-mentioned drawback may occur both because the inertia of the movable part does not permit stopping in good time, once it has been verified that the residual distance $x2 - xn$ is less than the predetermined limit, and because the position increment D$xn$ effected during an interpolation cycle is greater than the required positioning accuracy, so that it may happen that in the course of a single interpolation cycle at the beginning of which the movable part has not yet reached the final position with the required approximation, the movable part passes the final point itself without there being any possibility of becoming aware of such passing.

A better solution is that illustrated in FIG. 2, in which the movement of approach is split into two phases T4 and T5.

The phase T4 starts when the inequality (9) occurs. During this phase T4, the interpolating unit carries out the following operations:

$$x(n + 1) = xn + Dxnf \qquad (3'')$$

$$x2 - xn < 16 \ \mu m \qquad (10)$$

Operation (3'') produces the movement at constant speed, that is at constant position increments equal to the increment D$xnf$ reached at the end of the deceleration phase, that is reached on the first occurrence of inequality (9). The comparison operation (10) produces the end of the phase T4.

During the phase T5, the interpolating unit carries out the following operations:

$$x(n + 1) = xn + hx \qquad (3''')$$

$$x2 - xn < 1 \ \mu m \qquad (10)$$

Operation (3''') produces the movement at constant speed equal to $hx/DT$. The choice of this speed value, though not necessary, is convenient. The comparison operation (10') produces the end of the phase T5 and therefore also the end of the entire interpolation.

It is therefore clear that the phase T3 finishes when, during the deceleration, a sufficiently low speed is reached, for example, corresponding, according to (9), to a position increment $1\mu m$ effected during an interpolation cycle, and that the phase T4 finishes when the movable part has arrived at a prefixed distance from the final point P2, said distance being, for example, 16 $\mu m$ in accordance with formula (10); and that the final phase T4 finishes when the movable part has arrived, in accordance with (10'), at a distance from the final point less than the desired accuracy (which has been assumed to be equal to 1 $\mu m$).

Once the movable part has been brought to a position less than 1 $\mu m$ (required accuracy) from the final point, the interpolation is interrupted, as has been seen, and the movable part can be stopped and locked in position by any known means, for example a braking system or a mechanical clamp. Preferably, however, the movable part is held in position by the same positioning servo-mechanism fed with constant position orders. To this end, the position order may be either that constituted by the last coordinates calculated during the interpolation, or preferably that constituted by the coordinates of the final point P2 which are supplied by the program unit.

Figure 3:
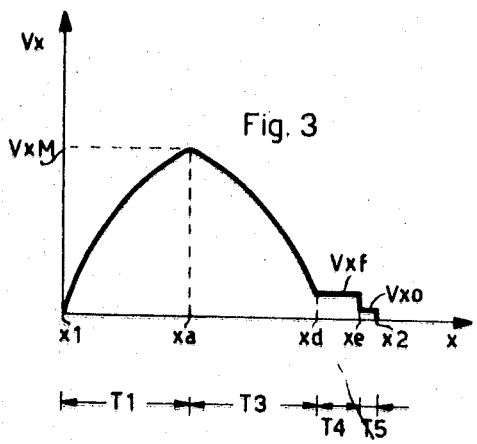

Apart from the case illustrated in FIG. 2, other cases may occur according to the distance to be travelled between the points P1 and P2. FIG. 3 shows the case where the segment covered at constant speed V$x$M is missing from the speed diagram, since the conditions which produce the start of the deceleration phase occur before the acceleration phase finishes. The displacement of the movable part of the machine between the positions $x1$ and $x2$ therefore comprises an initial acceleration phase of duration T1, between the positions $x1$ and $xa$, at the end of which the speed reached is less than or equal to the maximum permitted speed, and an immediately following deceleration phase of duration T3, between the positions $xa$ and $xd$; these phases are followed by the phases T4 and T5 at constant stepped-down speeds, in a similar manner to the case of FIG. 2. The position $xa$ is determined by the occurrence of the start-of-deceleration condition (8) that is $$x2 - xn < \left(\sum_{1}^{n} Dxn\right) + Dxn$$

or by the occurrence of the corresponding condition for the axis Y.

Figure 4:
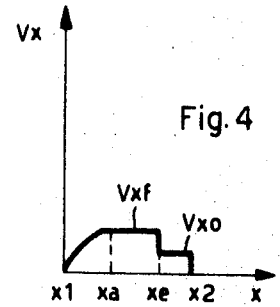

FIG. 4 shows the case where the distance $x2 - x1$ is greater than the limit 16 $\mu m$ and such that (8) occurs while (9) is also valid at the same time; in these circumstances, there is an acceleration phase from $x1$ to $xa$, followed by a phase at constant speed V$xf$ with a constant increment D$xnf$ equal to the last increment D$xn$ of the acceleration phase. Thereafter, when operation (10) has taken plase in the position $xe$, there will be a phase from $xe$ to $x2$ at constant speed V$xo$ with D$xn$ = $hx$.

Figure 5:
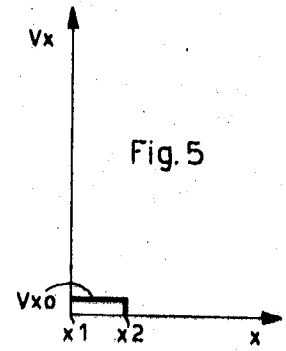

FIG. 5 shows the case where the difference $x2 - x1$ is less than 16 $\mu m$. In these circumstances, the condition (10) is immediately realized and the movement between $x1$ and $x2$ therefore takes place at constant speed V$xo$ with D$xn$ = $hx$.

It has therefore been seen what are the principles governing the interpolation operation.

The values D$x$M and D$y$M which are proportional to the maximum permissible speed for the movable part along the axes X and Y, respectively, are supplied as data by the program unit in the form of the digits K1V to K5V. The values $hx$ and $hy$, which are proportional to the acceleration along the axes X and Y, respectively, during the constant acceleration and deceleration phases, are calculated, on the other hand, from the program data, in particular from the coordinates of the end points of each rectilinear path segment, taking into account, moreover, that they must always be less than the value coresponding to the maximum permissible acceleration along each axis. In a preferred embodiment, this maximum acceleration may be chosen from among a plurality of values, on the basis of the type of machine used and the type of machining carried out, as will be seen.

In the calculation of the aforesaid values $hx$ and $hy$ which, in the constructional form described here, also correspond to the value of the minimum increment which the coordinates $xn$ and $yn$, respectively, may undergo in an interpolation cycle, account is moreover taken of the angular accuracy with which it is desired that the rectilinear path be covered. It should be noted, in fact, that as the path is covered by means of an interpolation obtained by accumulating the position increments D$xn$, D$yn$, which in turn are multiples of the values $hx$ and $hy$, respectively, any error in the initial calculation of $hx$ and $hy$ has the effect of causing a path to be covered which is still rectilinear, inasmuch as (1) continues to be observed, but is not quite properly inclined with respect to the axes X, Y, so that the final point of the path thus calculated by the interpolating unit will not coincide with the programmed final point. If it is desired that the distance between the two final points should not exceed the maximum permitted inaccuracy of positioning along each axis, it will be necessary to limit suitably the inaccuracy with which $hx$ and $hy$ are calculated.

Assuming, for example, that the maximum inaccuracy of 1 $\mu m$ hereinbefore established is also retained at the end of a displacement P2 − P1 equal to the possible maximum of the order of 10m, that is $10^7 \mu m$, it will be necessary that the increments $hx$ and $hy$ of the coordinates $xn$ and $yn$, respectively, be determined with an approximation equal to $10^{-7}$ $\mu m$ (or, in binary form, with an approximation equal to $2^{-24}$ $\mu m$).

In order to calculate the values $hx$ and $hy$ so that:
a. their ratio is equal to $(x2 - x1)/(y2 - y1)$, that is so that they also satisfy the equation (1);
b. the said values are determined with an accuracy sufficient to ensure the angular accuracy desired for the path;
c. the said values do not exceed the value corresponding to the maximum permissible acceleration;

the procedure hereinafter described is followed.

The quantities $(x2 - x1)H$ and $(y2 - y1)H$ are calculated, in which $x2 - x1$ and $y2 - y1$ are expressed as pure binary numbers formed of 24 bits, so that their value is defined with an accuracy of $2^{-24}$, which, as has been seen, ensures compliance with the condition $b$), and in which H is a non-dimensional constant equal to a power of 2, and such that $(x2 - x1)H$ and $(y2 - y1)H$ must be less than the maximum speed increment (acceleration) permissible for the machine. H is a constant which can be set up on a switch of the machine.

Thereafter, the two quantities $(x2 - x1)H$ and $(y2 - y1)H$ are multiplied simultaneously and repeatedly by 2, until one of the two quantities reaches the value corresponding to the maximum acceleration.

It is clear that in the aforesaid successive multiplications by 2, the aforesaid quantities continue to satisfy the condition a). Moreover, they also continue to satisfy the condition b), provided that no binary digit is discarded in carrying out the successive multiplications. It is moreover clear that, by stopping the successive multiplications at the moment that has been mentioned, the condition c) is observed.

Figure 6:
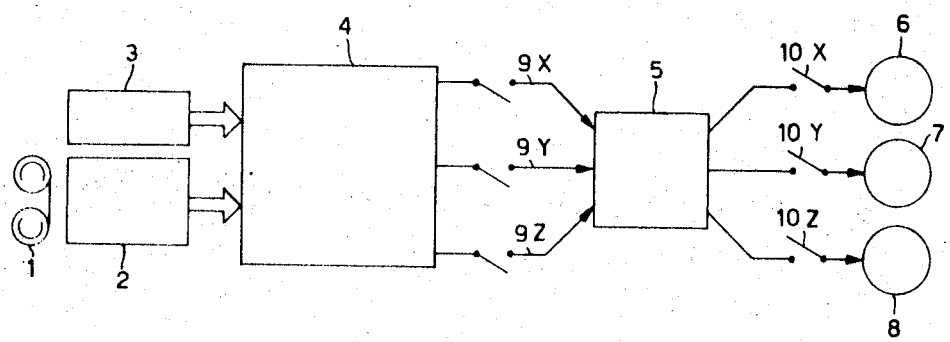

In a preferred embodiment, as shown in FIG. 6 the control device is fed by a program unit comprising a tape 1 carrying a recorded program, a tape reader 2 and a device 3 for varying the programmed speed of advance or feed. The control device comprises an interpolating unit 4 which is essentially a digital computer feeding a digital-to-analog converter 5, which in turn feeds the servo-mechanisms 6, 7, 8 adapted to position the movable part along the axes X, Y and Z, respectively, assuming that the machine tool has three axes to be controlled.

The operation of the control device comprises a first period in which the program unit supplies to the interpolating unit 4 the data hereinbefore described, that is the coordinates $x2$ and $y2$ of the final point P2 of the path, and the maximum speeds DxM and DyM at which the path is to be covered. During this period, the movable part is stationary at the starting point P1. A second period follows in which, while the movable part still remains stationary and the program unit moreover remains inoperative, the interpolating unit 4 sees to the calculation of the values $hx$ and $hy$ (speed increments) on the basis of the principles hereinbefore set forth. A third period follows in which, while the program unit remains inoperative, the interpolation true and proper takes place. During this third period, the interpolating unit 4 is operative to control in real time the positioning of the movable part.

More particularly, the servo-mechanisms 6, 7, 8 are position servo-mechanisms, that is they are adapted, when a position order has been received, to bring the movable part into the position indicated in that order, the speed and the instantaneous acceleration of the improvement being determined by the instantaneous value of the position error. More particularly, the servo-mechanisms and the manner in which they are fed by the digital-to-analog converter 5 are generally of the kind described in Joseph Elbling application Ser. No. 400,986, filed Oct. 2, 1964.

It is therefore clear that the servo-mechanisms receive position orders at a rate depending on the rate at which the interpolation cycles follow one another.

In one embodiment there is provided for each displacement axis of the machine tool a separate digital-to-analog converter which is fed at its input by the digital signal processed by the interpolation unit and supplies an analog control signal at its output to a transducer controlling the movement of the movable part of the machine along the corresponding displacement axis.

If the transducer is a cyclic position measuring device, in order to position the movable part of the machine it is sufficient to specify digitally the absolute position within each cycle or step of the measuring device. The use of a cyclic position measuring device for each displacement axis enables the number of binary digits necessary for representing all the possible positions of the movable part along the axis to be reduced. For example, by using a position measuring device of the type described in U.S. Pat. No. 2,799,833, comprising a fixed multipolar winding and a pair of movable windings fast with the movable part of the machine, the position of the movable part can be represented by the relative displacement, expressed in electrical degrees, between the fixed winding and the movable windings. Assuming that the pole pitch of the fixed windings is equal to 2 mm and, if it is desired to achieve for the positioning an approximation of 1 $\mu$m, the positions between 1 $\mu$m and 2 mm within each step will be expressible by means of the 10 least significant binary places of the number representing the value of the coordinate; the other more significant binary places of this number may be disregarded for the purposes of representing the position along the axis in question, inasmuch as they only indicate the number of complete steps of the position measuring device which have already been covered.

In another embodiment, if it is desired to reduce the number of digital-to-analog converters that are necessary, a single converter is used for all the displacement axes. In this case, it is necessary to transmit the information signals to the transducers relating to the various displacement axes by the time-division technique. That is, the axes are addressed cyclically for the transmission of the corresponding signals and, therefore, the information signals relating to the same instant of time are distributed to the various axes at successive times. This is shown symbolically in FIG. 6, in which the switches 9X, 9Y, 9Z are understood to be closed cyclically to feed the digital-to-analog converter 5, and similarly the switches 10X, 10Y, 10Z are understood to be closed cyclically to feed the servo-motors 6, 7, 8.

The considerations hereinbefore discussed for the case of only two displacement axes X and Y are immediately applicable to the case of three displacement axes X, Y, Z.

In particular, a relation similar to (1) must also exist between the coordinates $xn$ and $zn$; moreover, all the operations and comparisons hereinbefore examined in describing the interpolation will be carried out on the coordinate $zn$.

INTERPOLATING UNIT

A complete description of the interpolating unit is contained in our earlier specification. Only the ideas necessary for understanding the subject matter of the present invention are recalled here.

The interpolating unit essentially comprises a closed loop comprising a cyclic memory constituted by a delay line, writing and reading registers connected to the input and output respectively of said delay line and an arithmetical unit connected between the registers. The delay line, for example of the magnetostrictive type, has a delay of, for example, 2.4 ms. More particularly, the memory is of the type described in Perotto and De Sandre application Ser. No. 701,193, filed Jan. 29, 1968, now U.S. Pat. No. 3,469,244 and is only briefly described here. Bits with a duration of 1 $\mu$s are written in the delay line and this is therefore able to contain a maximum of 2400 bits.

The interpolating unit moreover comprises a timing device permitting the association with each bit issuing from the delay line of a special digit specifying the position of the bit within the store. The timing of the delay line is scanned by the timing device with a frequency of 1 MHz.

The delay line is not completely filled by the bits circulating therein; there are only 2160 bits of information which it is necessary to record in the delay line and, at the nominal frequency of 1 MHz these occupy only 2160 $\mu$s of the 2.4 ms corresponding to the actual delay length of the delay line.

The timing device is activated from the first bit issuing from the delay line and, when it has counted all the 2160 binary places of the memory, a STOP signal is produced and stops the device.

For each axis X, Y, Z, the memory comprises 12 registers A, B, C, ...N, each comprising 60 binary places DE00 - DE59, defined in increasing order, in all precisely $3 \times 12 \times 60 = 2160$ binary places. If a group of 12 bits of the same binary order belonging to the 12 registers, respectively, is considered, these bits represent 12 binary digits of the corresponding 12 digital quantities contained in said registers and are recorded in series on the delay line; another group of 12 bits of the same binary order, representing the 12 binary digits of the immediately following order (higher or lower) of said quantities, is recorded in the delay line in series with the first group. The 12 registers are therefore disposed in the delay line in time division multiplex form. If we indicate the $n$th binary place of the generic register K by DE$n$K, the arrangement of the binary places in the delay line will therefore be, for each axis, DE00A, DE00B, DE00C, ...DE00N; DE01A, DE01B, DE01C, ...DE01N; ...DE59A, DE59B, DE59C, ...DE59N. The three groups of $12 \times 60$ bits ordered in this way and referring to the three axes are arranged in the delay line one after the other.

The manner in which the binary places of the various registers are specified will now be described in greater detail.

A bit order counter counts from 1 to 60, energizing the signals DE00 to DE59 separately and successively. For each of the 12 registers of the memory, the signals DE00 to DE59 specify the 1st, 2nd, ...60th bit, that is the binary places from 0 to 59.

The places DE01 to DE056, specified by signals DE01 - DE56, respectively, are used to represent the digital values $2^{-33}$ $\mu$m to $2^{24}$ $\mu$m (that is, in decimal form, the values between $10^{-10}$ $\mu$m and $10^7$ $\mu$m), which enable all the positions between 1 $\mu$m and 10 m to be represented with the required approximation of $2^{-24}$ $\mu$m. Therefore, the position specified by DE33 corresponds to the value 1 $\mu$m. It is therefore clear that all the quantities are represented in the memory registers by means of 56 bits.

All these 56 bits are processed in the arithmetical operations either of transfer or comparison carried out by the interpolating unit.

On the other hand, the data introduced by the program unit consist of only 24 significant bits representing, in the case where the data are coordinates, the values from 1 $\mu$m to $10^7$ $\mu$m. In the operations of introducing the data from the program unit into the store, the said 24 bits are therefore introduced into the 24 binary places corresponding to the order of these bits, it being understood that the remaining binary places to the right and left of the 24 binary positions are filled with bits equal to zero. Thus, for example (FIGS. 12 and 13), the 24 bits of $x2$ (which represent values between $1\mu$m and $2^{24}\mu$m) are introduced into the register D in the binary places DE33 to DE56. Similarly, the 24 bits of D$x$M, which represent values of the maximum increment (maximum permitted speed) and which respectively correspond to the values $2^{-13}\mu$m to $2^{10}$ $\mu$m, are introduced into the register B (101) in the places DE20 to DE43, specified by the signals DE20 to DE43.

It is also obvious that, in the case where the interpolating unit according to the invention is applied to the control of a machine tool, the speed range, represented by the range of the values of D$n$M, is excessive and, for normal uses, 14 significant bits in the places from 30 to 43 representing values of the maximum increment between $2^{-3}$ $\mu$m and $2^{10}$ $\mu$m will be sufficient; assuming that the output of a coordinate $xn$ from the interpolating unit takes place every 5 ms (period of the memory cycle), there will be obtained in correspondence, values of the speed which range between 1.4 mm per minute and 12.288m per minute, which are sufficient for all normal purposes. Such values of the maximum increment may also be expressed in decimal form by the use of five digits, as has already been assumed in the section giving the general description.

The place DE57 is used to store the sign of the number. More precisely, as complements are used in place of negative binary numbers, this place will be used to distinguish a positive number from a complemented number.

The place DE58, specified by the signal DE58, is used to store carries.

The places DE59 and DE00, specified by the signals DE59 and DE00, respectively, remain free in all the store registers and act as separating places between the registers of different axes, thus avoiding the carries having to be propagated from one axis to the adjacent one.

In the memory there is first written all the information relating to the axis X (in all $12 \times 60 = 720$ bits), then that relating to the axis Y (720 bits), then that relating to the axis Z (720 bits). In all, therefore, there are 2160 binary places in the memory which are occupied for the three axes.

The bit order counter repeats the count of the 60 binary places three times, once for each address X, Y, Z. The times relating to the three addresses are specified by signals INIC, INIP and INAZ, respectively, which are generated by another counter controlled by the bit order counter.

A counter controlled by the signal timing the end of the information in the store alternately activates its own outputs GIRI and GIRI; the period of the signal GIRI is therefore equal to two circuits of the information along the delay line and this period characterises the duration of an interpolation cycle.

To the memory registers there correspond an equal number of binary registers staticizing the writing (at the input of the line) and the reading (at the output of the line). Considering only eight memory registers A, B, C, D, E, F, I and L, as four of these memory registers, namely A.E. I and C, are specified by signals TI00, TI02, TI03 and TI04, respectively, of the timing counter during a half-period in which GI00 = "1", while the other four memory registers (B, D, F and L) are also specified by the same signals TI00, TI02, TI03 and TI04, respectively, during the half-period in which GI00 = "0", four binary staticizing registers are sufficient both for reading and for writing the memory data and, in one half-period they function as registers denominated A, E, I, C and, in the following half-period they function as registers denominated B, F, L, D (FIGS. 12 and 13).

It is therefore clear that the binary writing registers and the means associated therewith constitute a parallel-to-serial converter feeding the delay line, while the binary reading registers and the associated means constitute a serial-to-parallel converter supplied by the delay line. Therefore, seen from the external processing means, the delay line is equivalent to an assembly of four recirculating registers A, C, E, I in parallel plus another four recirculating registers B, D, F, L in parallel having their inputs and outputs in common with the first four registers, respectively, and out of phase with respect to the first four registers.

Figure 12:
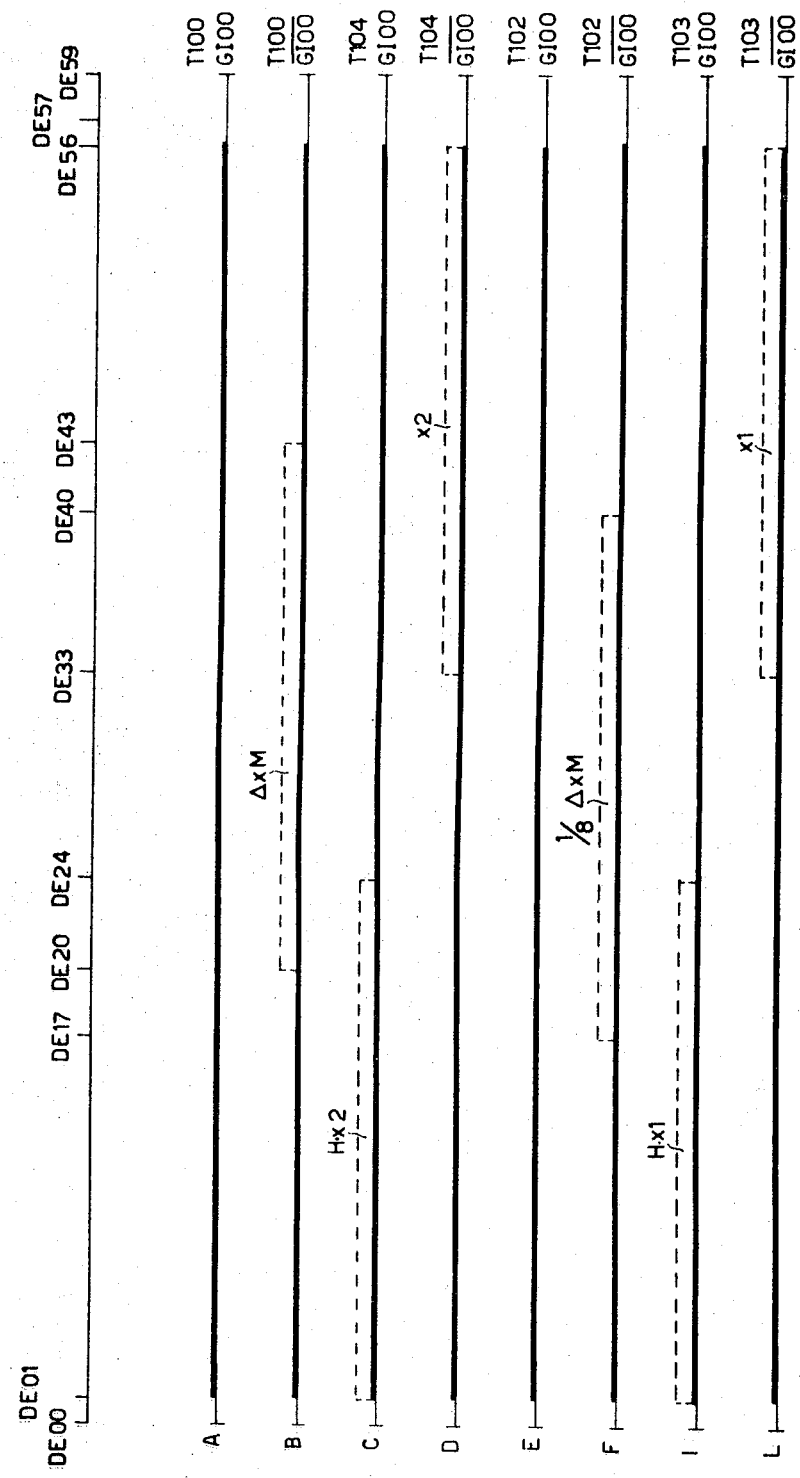
Figure 13:
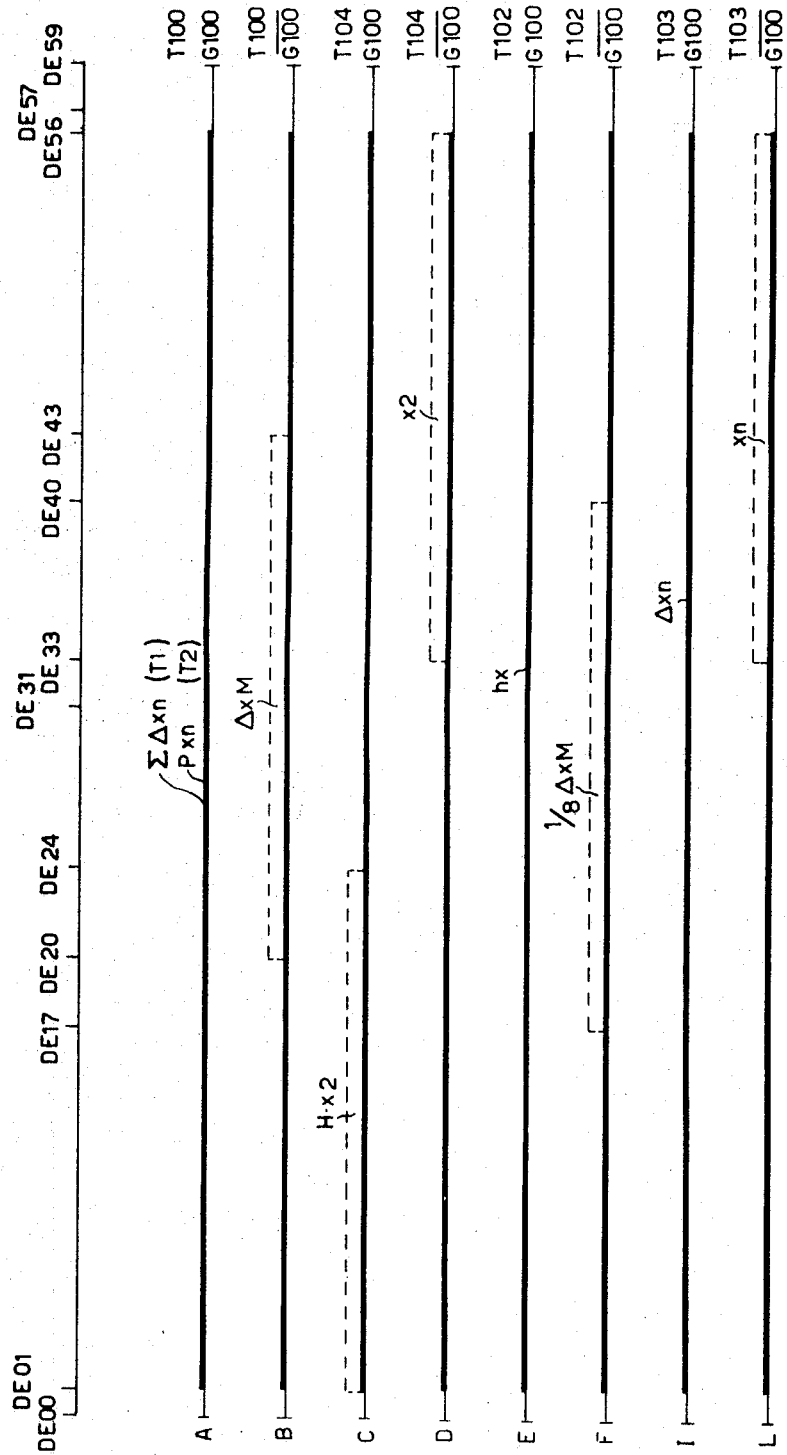

FIG. 12 relates to the arrangement of the various digital quantities in the store registers during the entering phase while FIG. 13 illustrates the arrangement of the digital quantities in the memory registers during the computation phase.

The memory registers function in the folowing manner, referring to the axis X.

During the interpolation (FIG. 13), the register A serves to store the value $\Sigma$ D$x$n obtained by operation (4), that is the progressive distance $xn - x1$, for the whole acceleration phase T1, and thereafter to keep stored the value P$xn$M obtained on the basis of operation (5) at the end of the phase T1.

Into the register B (101) there is introduced, in the phase of introduction of the data from the program unit (FIG. 12), the maximum increment D$x$M (maximum permissible speed along the axis X). This value D$x$M is initially written in the binary places DE17 to DE40 of the register B and is thereafter shifted by three places so as to be written in the places DE20 to DE43, where it is preserved unchanged until the program unit introduces another value or effects a modification thereof.

Into the register C there is introduced in the phase of introduction of the data from the program unit (FIG. 12) the coordinate $x2$ of the final point P2, shifted however, by $\log_2 H = 33$ binary places towards the least significant places. The register C therefore comes to contain the quantity H · $x2$ necessary for calculating the speed increment $hx$.

Into the register D there is introduced, in the phase of introduction of the data from the program unit (FIG. 12), the coordinate $x2$ of the final point P2. This quantity is preserved unchanged in the register D throughout the interpolation for the purpose of permitting the execution of the operation (6) of calculation of the remaining distance to be traveled.

At the end of the interpolation of a path segment, the contents of the register D are transferred to the register L and are preserved there to be used as the initial coordinate $x1$ of the next rectilinear segment. It has been seen, in fact, that the program unit only supplies the final coordinates of the rectilinear segments.

The register E serves to contain the speed increment $hx$ during the interpolation phase (FIG. 13).

The register F (100) serves to contain the quantity ⅛ D$x$M during the entering and interpolation phases, this quantity being introduced directly from the program unit into the register F (100) in the binary places DE17 to DE40. The quantity ⅛ D$x$M is used to modify the maximum speed of advance or feed D$x$M, as will be explained hereinafter.

At the end of the interpolation phase (FIG. 12), the quantity H · $x2$ is transferred to the register I, this quantity having been contained in the register C until that time. As a result of this transfer, the register I comes to contain the quantity H · $x1$ valid for the next rectilinear segment to be covered, inasmuch as the final point P2 of a rectilinear segment coincides with the initial point P1 of the following rectilinear segment. This quantity H · $x1$ is preserved in the register I only for the time sufficient to permit the calculation of $hx$, which, as has been said, occurs before the interpolation. During the interpolation (FIG. 13), therefore, the register I is free to contain the increments D$xn$ as they are calculated.

The contents of the register L, into which, as has been said, the initial coordinate $x1$ of the following rectilinear segment to be covered is introduced from the register D at the end of the interpolation, are incremented bit by bit during the interpolation, so that the register L contains bit by bit the successive values of the instantaneous coordinate $xn$. It is therefore clear that the register L is adapted to feed the servo-systems and is therefore the only memory register whose output is connected to the digital to analog converter.

In FIGS. 12 and 13, the broken lines relating to the registers B, C and D represent that group of 24 adjacent binary spaces from among the 56 binary places of each register into which the relative datum is introduced from the program unit, while the broken lines relating to the registers F, I and L, represent the 24 adjacent binary places to which the data contained in the registers B, C and D, respectively, are transferred.

The functions and contents of the registers relating to the axes Y and Z are similar.

As already hereinbefore stated, each interpolation cycle comprises two memory cycles, one distinguished by the presence of the signal GIRI and the other distinguished by the presence of the signal $\overline{\text{GIRI}}$. The first of these memory cycles is used for the logical comparison operations (operations (7), (8), (9), (10) and (10')) which define the end of the phases T1, T2, T3, T4, and T5, respectively), while the second of the memory cycles is used for the computation operations which define the speed and acceleration in each of the phases of the movement. Therefore, in the first memory cycle, the changes of acceleration are decided by means of the comparison operations; while in the second memory cycle the computation of the position increment relative to the interpolation cycle is performed on the basis of the decisions made.

Program Unit

The program unit (FIG. 6) comprises the program tape 1, the tape reader 2 and the device 3 for varying the feed speed programmed on tape, as well as a device for manual programming which simulates the programming by tape, this device not being shown in the drawing.

A complete description of the program tape and the tape reader is contained in our earlier specification Ser.

No. 575,802 to which reference should therefore be made.

The device 3 for varying the feed speed which forms the subject matter of the present invention will now be more particularly described. The device 3 permits the modification, by means of a switch, of the feed speed of the movable part of the machine along the relevant axes, which is programmed by tape or by means of the manual entering device.

The embodiment hereinafter described relates to the case where the possible variations of speed range between 12.5 percent and 100 percent, in seven jumps each of 12.5 percent. For simplicity, there will moreover be described a device 3 which sets only percentage reductions of the programmed feed speed: it will therefore be understood that in the 100 percent position of the switch the feed speed is the programmed speed. Extension to the case where it is also possible to set percentage variations increasing the programmed feed speed will be obvious to the man skilled in the art. However, also with the aforesaid limitation, the case of increase of the programmed feed speed may be taken into consideration where this is intended as an operation following a preceding reduction. The 0 percent position of the switch will correspond to stopping of the feed of the machine.

Since, in each rectilinear section or segment of the path of the movable part of the machine, the feed speed along the axes assumes the value VM programmed as has been hereinbefore described, when the switch for setting the change in speed is shifted during the machining operation from the 100 percent position to another position (for example 50 percent) the movement of the movable part of the machine along the axes decelerates uniformly until it assumes the new speed corresponding to the indication given by the switch (50 percent of the programmed speed) On the other hand, if, while the movable part of the machine is moving at this last-mentioned speed, the setting switch is brought into a new position corresponding to a larger percentage (for example 75 percent), the movement of the movable part of the machine along the axes accelerates uniformly until it assumes the new speed corresponding to the indication given by the switch (75 percent of the programmed speed).

If, therefore, the switch is shifted during the machining process, the machine reaches the new speed that has been set with controlled acceleration and deceleration. Thus, the operator is afforded the possibility of intervening during the machining to fix a feed speed suitable for the working operations in progress.

FIGS. 7, 8, 9 and 10 show various possible cases of varying the programmed feed speed along a rectilinear displacement segment from P1 to P2 (FIG. 1), according to the phase of the movement at which the variation of speed intervenes and according to the sign of the variation. The above-mentioned drawings all relate to the displacement axis X.

It is necessary to make clear that there is only one variation in speed set for all the axes and that this variation acts on all the axes and modifies the values $D_xM$, $D_yM$, $D_zM$ (maximum permissible increments) supplied by the program by the same percentages.

Moreover, in each rectilinear path segment of the movable part, it is possible to set variations of speed only during the phase T1 (uniform acceleration) and the phase T2 (constant speed) of the movement, while the occurrence of the condition (8), which produces a deceleration order and the beginning of the phase T3, excludes the possibility of setting variations in speed.

Finally, it is observed that the setting of a variation in the feed speed causes a modification of the phase T2 of the movement and shifts the limits of the initial acceleration phase T1 and of the final deceleration phase T3, while leaving the values of the speed increments along the axes ($h_x$, $h_y$, $h_z$) in the phases T1 and T3 unchanged.

Figure 7:
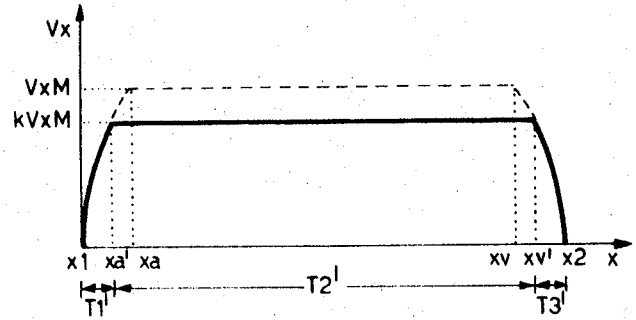

FIG. 7 is a speed diagram along the axis X between the coordinate points $x1$ and $x2$, respectively. If $V_xM$ is the maximum value permitted by the program for the feed speed along the axis in the path segment between $x1$ and $x2$, if $k$ ($<1$) represents the percentage value set on the speed varying switch, $kV_xM$ will represent the new maximum value of the feed speed (less than the programmed value).

Assuming that the change of speed is effected before the acceleration phase T1 is terminated, the diagram shown by a solid line in FIG. 7 will be obtained. The broken line represents that part of the diagram which is excluded with respect to the normal case by means of the change of speed. By comparison with the normal case of programmed speed (hereinbefore described with reference to FIG. 2), it is observed that the acceleration phase T1' is reduced, inasmuch as it terminates at the coordinate point $xa'$ ($<xa$) at which the new feed speed $kV_xM$ is reached; the constant speed phase T2' is extended, inasmuch as it begins earlier and terminats at the coordinate point $xv'$ ($>xv$); finally, the constant deceleration phase T3' is reduced, inasmuch as it begins at the coordinate point $xv'$ ($>xv$). (Phases T4 and T5 are omitted from FIGS. 7 to 10 for simplicity.)

Figure 8:
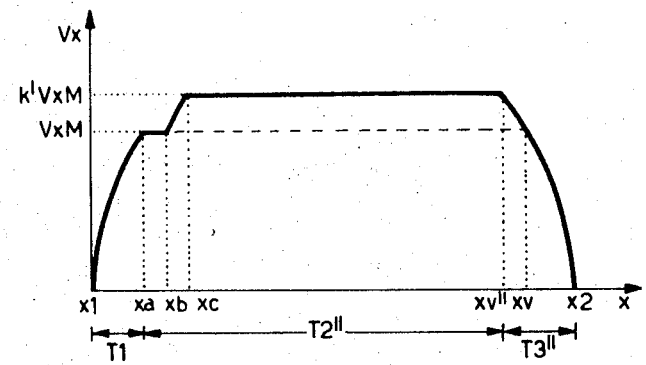

The solid-line diagram of FIG. 8, on the other hand, illustrates the case in which the change of speed is effected in the course of the constant-speed phase by setting a percentage $k'$ ($>1$), which produces the new value $k'V_xM$ of the maximum feed speed (this value being greater than the programmed value $V_xM$). As soon as the setting of the speed variation has been effected, the movement will resume acceleration in correspondence with the coordinate $xb$ reached at that instant, with a constant speed increment equal to that of the phase T1, until the new maximum permitted speed $k'V_xM$ is reached in correspondence with the coordinate $xc$; the movement thereafter continues at a constant speed until, in correspondence with the coordinate $xv''$, the condition (8) producing the commencement of the deceleration phase occurs. In this case, the phase T2'' becomes composed of two constant-speed sections united by an intermediate constant-acceleration section, while the phase T3'' is extended with respect to the normal programmed case, inasmuch as it begins at the point $xv''$ ($<xv$).

Figure 9:
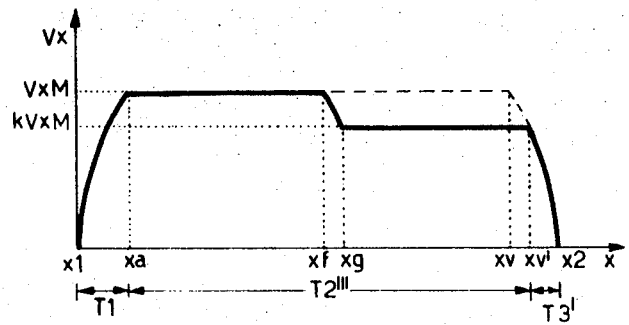

The solid-line diagram of FIG. 9 illustrates another case in which the change of speed is again effected in the course of the constant-speed phase by means of the setting of a percentage variation $k$ ($<1$) which produces the new value $kV_xM$ of the maximum feed speed (this value being less than the programmed value $V_xM$). As soon as the setting of the speed variation has been effected, the movement begins to decelerate in correspondence with the coordinate $xf$ reached at that instant, with a constant speed increment equal to the increment during the phase T1, until the new maximum permitted speed $kV_xM$ is reached in correspondence with the coordinate $xg$; the movement thereafter continues at constant speed until the condition (8) producing the commencement of the final deceleration phase occurs in correspondence with the coordinate $xv'$. In this case, phase $T2'''$ becomes composed of two constant-speed sections united by an intermediate constant-deceleration section, while the phase $T3'$ is reduced with respect to the normal programmed case, inasmuch as it begins at the point $xv'$ ($> xv$). More precisely, during the phase of movement between the points $xf$ and $xg$ (phase $T2'''$), the deceleration brings the speed of movement below the value $kVxM$ by an amount not greater than the minimum increment $hx$, and the speed of movement thereafter rises again to reach the value $kVxM$.

Figure 10:
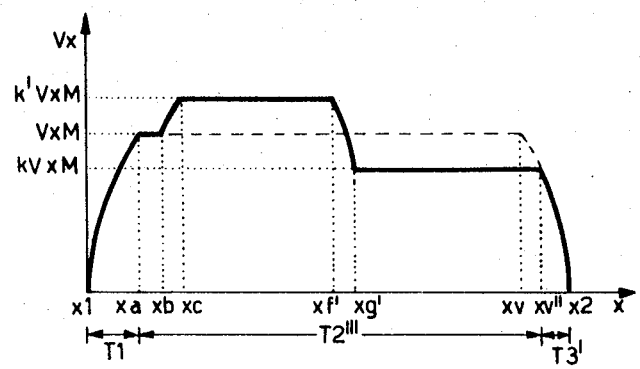

The solid-line diagram of FIG. 10 illustrates another case in which two variations of speed are effected in succession during the constant-speed phase by setting first the percentage variation $k'$ ($>1$) and then the percentage variation $k$ ($<1$). The diagram of FIG. 10 is therefore the result of a combination of the diagrams of FIGS. 8 and 9 and the observations relative to these last-mentioned drawings are directly applicable to the case of FIG. 10.

It has been seen hereinbefore that, during the phase of introduction of the data of the recorded program into the memory, the value $DxM$ which characterises the feed speed is introduced into the memory register B (101), while the value ⅛ $DxM$ is introduced into the register F (100). The value $DxM$ serves as a comparison term for establishing on the basis of operation (7) the end of the acceleration phase T1 and the beginning of the constant-speed phase T2. The value ⅛ $DxM$ is used as increment for modifying the contents of the register B by means of repeated addition or subtraction operations. It will be evident that other increment values can be used than ⅛ $DxM$, resulting in storage in register F (100) of the value $1/n\, DxM$, where n is a predetermined number.

The device for varying the feed speed operates in synchronous fashion with the interpolator once the speed variation has been set. More precisely, since each interpolation cycle is composed of two memory cycles, one devoted to comparison operations and the other devoted to computation operations, the device for varying the feed speed operates by incrementing the speed $DxM$ in successive steps each comprising two memory cycles, one devoted to the scanning of the sign of the required incrementation and the other devoted to the incrementation of $DxM$ by an increment equal to ⅛ $DxM$.

The switch permitting the setting of a percentage value $k$ of the programmed feed speed $DxM$ operates in jumps, each jump corresponding to a variation equal to ⅛ $DxM$. Therefore, if $q$ indicates the number of jumps of the switch from the normal position to the position marked by the percentage $k$, the state which must be achieved in the register B (101) after $q$ incrementation steps is as follows:

$$kDxM = DxM + q\,⅛\,DxM.$$

Figure 11:
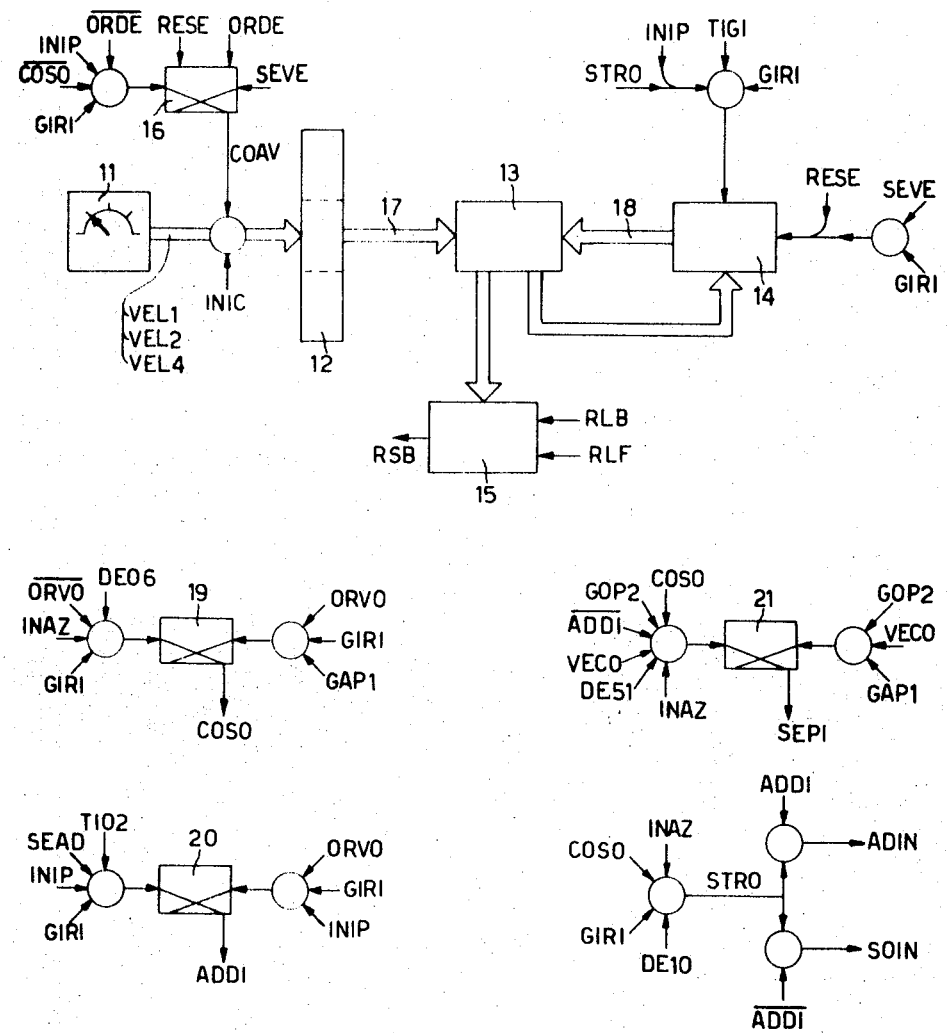

The structure and the operation of the speed varying device shown diagrammatically in FIG. 11 will now be described in greater detail. An eight-position switch 11 enables eight percentage values $k$ of the programmed feed speed to be set. The switch has three selectively activated output channels VEL1, VEL2, VEL4, each of which represents a binary place of a particular binary code. A binary representation therefore corresponds to each of the eight positions of the switch 11 on the three output channels. A cyclic binary code (Gray code) has been adopted which makes it possible to pass from one configuration to the following configuration by modifying the preceding configuration by a single bit and this eliminates any uncertainties in the interpretation of the configurations preset by the switch.

The code preset by the switch 11 is transferred, if the consents COAV and INIC exist, into a register 12 comprising three binary stages. The consent signal is supplied by a flip-flop 16 which is deenergized at the beginning of the phase of introduction of the speed from the program recorded into the memory (signal SEVE) and at the beginning of the deceleration phase (signal ORDE).

A counter 14 counts in eights counts by activating its three outputs 18 with the same code as is used by the switch 11. During the time specified by the signals INIP and GIRI of the timing counter of the interpolator, the counter 14 receives eight pulses TIGI and therefore explores all its configurations.

The counter 14 is zeroized both by the general zeroization signal RESE and by the signal SEVE (in the presence of $\overline{\text{GIRI}}$) which characterizes the phase of introduction of the speed into the memory.

The outputs 17 of the register 12 and the outputs 18 of the counter 14 feed a logic network 13 which conditions an adder 15 and the counter 14.

The adder 15 can be connected with the registers B (101) and F (100) of the memory of the interpolator through the corresponding reading registers and the connections RLB and RLF, respectively, and is adapted to feed the memory register B through the connection RSB and the corresponding writing register.

The logic network 13 effects a comparison between the code configurations at the two groups of inputs 17 and 18 and, according to the result of said comparison, acts on the adder 15 and on the counter 14 in the manner hereinafter explained.

As has been said, during the time specified by the signals INIP and GIRI of the timing counter of the memory, the counter 14 receives eight pulses and its outputs assume all the successive binary configurations of the code. During this operation, these three cases may occur:

a. the final configuration of the outputs 18 of the counter 14 coincides with that of the outputs 17 of the register 12; in this case, the flip-flops 19 and 20 contained in the logic network 13 (FIG. 11) are zeroized by the signal ORVO (coincidence of the two binary configurations) and the signals COSO and ADDI are therefore absent (that is, COSO = "0", ADDI = "0");

b. the final configuration of the outputs 18 of the counter 14 is different to that of the outputs 17 of the register 12, so that the flip-flop 19 is energized by the signal ORVO (non-coincidence of the two binary configurations) in the time specified by the signal INAZ, that is the signal COSO is activated; moreover, during the counting cycle of the counter 14, coincidence of the two binary configurations first occurs, so that the signal ORVO is activated, and thereafter the passage of the counter through the zeroizing configuration occurs, whereby the signal SEAD is activated. Consequently, the flip-flop 20 is first zeroized by the signal ORVO and then energized by the signal SEAD, as a result of which, at the end of the counting cycle of the counter 14, the output ADDI of the flip-flop 20 is activated. That is, in this case, COSO = "1", ADDI = "1";

c. the final configuration of the outputs 18 of the counter is different to that of the outputs 17 of the register 12, as a result of which the flip-flop 19 of the logic network 13 is energized by the signal $\overline{ORVO}$ (non-coincidence of the two binary configurations) in the time specified by the signal INAZ, that is the signal COSO is activated; moreover, during the counting cycle of the counter 14, the passage of the counter through the zeroizing configuration first occurs, as a result of which the signal SEAD is activated, and thereafter the coincidence of the two binary configurations occurs, as a result of which the signal ORVO is activated. Consequently the flip-flop 20 is first energized by the signal SEAD and then deenergized by the signal ORVO, as a result of which, at the end of the counting cycle of the counter 14, the output ADDI of the flip-flop 20 is deactivated. That is, in this case, COSO = "1", ADDI = "0".

When COSO = "1" (in the presence of GIRI, INAZ and DE10), the signal STRO is produced, which causes a supplementary counting in the counter 14 by one step forward or one step backward, according to whether ADDI = "1" (forward counting signal ADIN) or ADDI = "0" (backward counting signal SOIN). Moreover, if COSO = "1", during the memory cycle in which GIRI = "0" the adder 15 is enabled to carry out the following operations:

$$D_xM \pm \tfrac{1}{8} D_xM$$

$$D_yM \pm \tfrac{1}{8} D_yM$$

$$D_zM \pm \tfrac{1}{8} D_zM$$

in which the values $D_xM$, $D_yM$, $D_zM$ are the maximum feed speeds stored in the registers B (101) of the three axes from the program, while $\tfrac{1}{8} D_xM$, $\tfrac{1}{8} D_yM$, $\tfrac{1}{8} D_zM$ are fractions of the values of said maximum speeds stored in the registers F (100) of the three axes during the entering of the program, as has already been explained hereinbefore.

Therefore, the maximum feed speed contained in the memory register B of each axis increases or decreases with increments equal to $\tfrac{1}{8}$ of the programmed value during each interpolation cycle (in the memory cycle in which GIRI = "0"), every time COSO = "1".

For this reason, on shifting the switch 11 by a certain number $q$ of positions, it is necessary that the counter 14 receives the same number $q$ of supplementary counting signals made possible by STRO at the end of a counting cycle, before coincidence of the final configuration of the counter 14 with that of the register 12 reoccurs. Moreover, since an operation of incrementation of the maximum value of the feed speed contained in the memory register B (101) is carried out at each supplementary counting signal, after $q$ incrementations, that is after $q$ interpolation cycles, a speed value equal to that set on the switch 11 will be obtained in the register B.

If the signal ADIN is present and the counter 14 therefore counts forward by one step at each supplementary counting signal (in each interpolation cycle), the value of the speed stored in the register B (101) increases gradually and therefore, the movement of the movable part of the machine along the three axes accelerates until the new maximum speed is reached.

If, on the other hand, the signal SOIN is present and the counter 14 therefore counts backward by one step at each supplementary counting signal (in each interpolation cycle), the value of the speed stored in the register B (101) gradually decreases. Moreover, the flip-flop 21 of the logic network 13 (FIG. 11) is energized, inasmuch as under these conditions the signal VECO is necessarily present, this signal appearing as soon as condition (7) is realized, and therefore at the output of the flip-flop the signal SEPI, which controls the deceleration in the control device, is activated. Consequently, the movement of the movable part of the machine along the three axes decelerates until the signal $\overline{VECO}$ appears in correspondence with the cancellation of condition (7); the signal $\overline{VECO}$ deenergizes the flip-flop 20 and therefore clears the deceleration signal SEPI. Thereafter, a brief acceleration is performed in an interpolation cycle until the signal VECO is caused to reappear and then controls the movement at constant speed.

Finally, it should be noted that if, for a given axis, a new speed is entered in the memory from the program when a percentage variation of the speed programmed for the three axes has already been effected, the register 12 remains blocked in the preceding configuration (in fact the presence of SEME causes the deactivation of AVAC) and the counter 14 is zeroized. The modifying operations are thereafter carried out, according to the percentage entered in the register 12, only on the new speed entered, the operations for the other axes, for which the speed stored already corresponds to that indicated by the register 12, being suitably blocked.

It will be understood that numerous modifications in the hereindescribed embodiment of the invention are possible. Accordingly, the invention is not to be limited to that embodiment, but rather only by the scope of the appended claims.

What we claim is:

1. In a control device for positioning a movable part, a means for controlling the speed of positioning utilizing a machine readable program for controlling the movement of said part, said program including a first value representative of a maximum permissible speed and a second value representative of a fraction, less than unity, of said maximum permissible speed, said means comprising:

means for reading said program including means for entering said first and second values in to first and second storage areas, respectively, means for algebraically adding said second value to said first value a predetermined number of times in order to increase or decrease said first value, said means for adding comprising:

manually settable means for setting said means for adding to the value corresponding to said predetermined number of times.

2. In a control device for positioning a movable part along at least one axis, a programmed means for controlling the speed of movement of said part, said program including the maximum speed value for said movable part, comprising:

input means for reading said program, storage means connected to said input for storing said maximum speed value, means for altering said maximum speed value, comprising:
- manually controllable speed varying means for indicating a desired altered maximum speed value,
- recirculating counter means for indicating a plurality of possible altered maximum speed values,
- comparator means connected between said speed varying means and said recirculating counter means for comparing the outputs of the latter two elements, and
- algebraic adding means connected to an output of said comparator means for increasing or decreasing said maximum speed value in said storage means depending on the result of said comparison, said adding means being connected to said storage means.

3. In a device for controlling the positioning of a movable element, apparatus for controlling the speed of movement of said element, comprising:
- algebraic adder means having a first input and a second input and an output,
- first and second storage registers, said first storage register having an output connected to said first adder input, said second register having an output connected to said second adder input, and said first register having an input connected to said adder output,
- first input means connected to said first and second registers for entering a first value corresponding to the maximum permissible speed of said movable element and a second value corresponding to a predetermined fraction less than unity of said maximum permissible speed, said first and second values being entered into said first and second registers, respectively, and
- manual input means for activating said adder to algebraically add said second value to said first value and place the result of said algebraic addition into said first register while leaving said second value in said second register unaltered.

4. Apparatus for controlling the feed of a movable machine part from a first point to a second point, comprising:
- interpolating means providing signals for controlling the movement of said machine part comprising first register means for storing a value corresponding to a maximum permissible speed of said movable machine part and second register means for storing a value corresponding to a fraction less than unity of said maximum permissible speed,
- first input means connected to said interpolating means for transmitting thereto signals corresponding to said maximum speed value and said fraction value for entering said values into said first and second registers, respectively,
- second input means connected to said interpolating means in parallel with said first input means for altering said maximum speed value stored in said first register,
- said second input means comprising:
  - manually operable means for entering a numerical value representative of a speed different from said maximum speed,
  - recirculating counter means for producing values corresponding to a plurality of possible speeds,
  - means for algebraically adding the contents of said second register to the contents of said first register in order to increase or decrease the value of the contents of said first register depending on the relative values of the contents of said first and second registers, and
  - means for comparing the outputs of said manual entering means and said counter, said comparing means including output means for activating said adding means and means for altering the numerical indication of said counter, the state of said activating output means and said altering means being determined by the relative values of said outputs of said manual entering means and said counter.

* * * * *